United States Patent
Onishi et al.

(10) Patent No.: US 12,508,553 B2
(45) Date of Patent: Dec. 30, 2025

(54) SLURRY STORAGE DEVICE, SLURRY PRODUCTION SYSTEM AND SLURRY STORAGE METHOD

(71) Applicant: NIHON SPINDLE MANUFACTURING CO., LTD., Hyogo (JP)

(72) Inventors: Keiichiro Onishi, Hyogo (JP); Keiichi Asami, Hyogo (JP); Takashi Mukai, Osaka (JP); Taichi Sakamoto, Osaka (JP); Hideaki Tanaka, Osaka (JP); Hiroshi Senoh, Osaka (JP); Masahiro Yanagida, Osaka (JP)

(73) Assignee: NIHON SPINDLE MANUFACTURING CO., LTD., Hyogo (JP)

(*) Notice: Subject to any disclaimer, the term of this patent is extended or adjusted under 35 U.S.C. 154(b) by 875 days.

(21) Appl. No.: 17/752,482

(22) Filed: May 24, 2022

(65) Prior Publication Data
US 2022/0280902 A1 Sep. 8, 2022

Related U.S. Application Data

(63) Continuation of application No. PCT/JP2020/040977, filed on Oct. 30, 2020.

(30) Foreign Application Priority Data

Feb. 3, 2020 (JP) .............................. JP2020-016442

(51) Int. Cl.
*B01F 23/00* (2022.01)
*B01F 23/53* (2022.01)
(Continued)

(52) U.S. Cl.
CPC ............ *B01F 23/53* (2022.01); *B01F 33/402* (2022.01); *B01F 35/2113* (2022.01);
(Continued)

(58) Field of Classification Search
CPC .. B01F 23/53; B01F 35/2215; B01F 2101/08; B01F 35/7176; B01F 35/71731; B01F 2101/59; H01M 4/139; H01M 4/525
See application file for complete search history.

(56) References Cited

U.S. PATENT DOCUMENTS

| | | |
|---|---|---|
| 11,251,418 B2 | 2/2022 | Sakamoto et al. |
| 2013/0034651 A1 | 2/2013 | Buqa et al. |

(Continued)

FOREIGN PATENT DOCUMENTS

| | | |
|---|---|---|
| EP | 3 466 531 A1 | 4/2019 |
| JP | 2005-026089 A | 1/2005 |

(Continued)

OTHER PUBLICATIONS

Takashi Mukai, "Battery market and development trends of electrode materials for next-generation lithium-ion batteries, safety requirements", High energy density and high output of electrode materials for next generation batteries, Nov. 2017, pp. 3-12, Chapter 1, Section 1, IPROS Corporation, Japan.
(Continued)

*Primary Examiner* — Anshu Bhatia
(74) *Attorney, Agent, or Firm* — Michael Best & Friedrich LLP

(57) ABSTRACT

A slurry storage device that stores an aqueous slurry containing a high nickel material prepared by a dispersion device which mixes a powder and a solvent, the device includes a holding unit that holds the aqueous slurry, and a pH value rise suppressing unit that suppresses a rise in a pH value of the aqueous slurry.

14 Claims, 7 Drawing Sheets

(51) Int. Cl.
  *B01F 33/40*      (2022.01)
  *B01F 35/21*      (2022.01)
  *B01F 35/221*     (2022.01)
  *B01F 35/71*      (2022.01)
  *B01F 35/90*      (2022.01)
  *H01M 4/139*      (2010.01)
  *H01M 4/525*      (2010.01)
  *B01F 101/59*     (2022.01)

(52) U.S. Cl.
  CPC ...... *B01F 35/2213* (2022.01); *B01F 35/2215* (2022.01); *B01F 35/71731* (2022.01); *B01F 35/7176* (2022.01); *B01F 35/71805* (2022.01); *B01F 35/90* (2022.01); *H01M 4/139* (2013.01); *H01M 4/525* (2013.01); *B01F 2035/98* (2022.01); *B01F 2035/99* (2022.01); *B01F 2101/59* (2022.01)

(56) References Cited

U.S. PATENT DOCUMENTS

| | | |
|---|---|---|
| 2016/0013492 A1 | 1/2016 | Buqa et al. |
| 2018/0183047 A1* | 6/2018 | Sakamoto .............. C01G 53/50 |
| 2019/0036103 A1* | 1/2019 | Pierce ................... H01M 4/139 |
| 2020/0067099 A1 | 2/2020 | Buqa et al. |
| 2020/0212482 A1 | 7/2020 | Makino |
| 2020/0373573 A1 | 11/2020 | Kim et al. |

FOREIGN PATENT DOCUMENTS

| | | |
|---|---|---|
| JP | 2013-038074 A | 2/2013 |
| KR | 2019-0068474 A | 6/2019 |
| WO | 2007/002503 A1 | 1/2007 |
| WO | WO-2017-138192 A1 | 8/2017 |
| WO | WO-2018-037805 A1 | 3/2018 |
| WO | 2018/172272 A1 | 9/2018 |
| WO | WO-2019-054191 A1 | 3/2019 |

OTHER PUBLICATIONS

International Search Report issued in Application No. PCT/JP2020/040977, mailed Dec. 22, 2020.

Search Report issued in European Application No. 20917538.9, mailed Feb. 20, 2023.

* cited by examiner

SLURRY STORAGE DEVICE, SLURRY PRODUCTION SYSTEM AND SLURRY STORAGE METHOD

RELATED APPLICATIONS

The contents of Japanese Patent Application No. 2020-016442, and of International Patent Application No. PCT/JP2020/040977, on the basis of each of which priority benefits are claimed in an accompanying application data sheet, are in their entirety incorporated herein by reference.

BACKGROUND

Technical Field

Certain embodiments of the present invention relate to a slurry storage device, a slurry production system, and a slurry storage method. More specifically, the present invention relates to the slurry storage device, the slurry production system, and the slurry storage method for an aqueous slurry containing a high nickel material.

Description of Related Art

With a widespread use of portable electronic devices such as notebook computers and tablet terminals, a demand for secondary batteries is increasing. As such a secondary battery, a lithium ion secondary battery having a high energy density, a high operating voltage, and being capable of downsizing and weight saving is widely used.

Normally, the lithium ion secondary battery is a secondary battery (storage battery) that uses lithium ion as an ion responsible for electrical conduction, and means a power storage device called, for example, a lithium ion battery, a lithium secondary battery, a lithium all-solid-state battery, a lithium polymer battery, a lithium gel battery, or the like.

As a positive electrode active material used in such a lithium ion secondary battery, as described in the related art, a lithium transition metal composite oxide containing a transition metal such as nickel, cobalt, and manganese is known.

Among the lithium transition metal composite oxides, a material having a particularly high nickel content is called a high nickel material, and is attracting attention as a positive electrode active material capable of stably extracting a high electric capacity.

On the other hand, in the production of electrodes for secondary batteries, although a slurry of a positive electrode active material (muddy suspension or paste suspended in a liquid using a solid as a solvent or a dispersion medium) is applied to a surface of a current collector, an organic solvent is mainly used when the slurry is produced. However, in recent years, regulations on the use of organic solvents (emission regulations) have become stricter in terms of environmental load, and the cost of a treatment to clear the emission regulations tends to increase. Therefore, it is required to reduce the use of organic solvents from the viewpoint of reducing the environmental load and the manufacturing cost.

For example, the related art describes an aqueous slurry in which an aqueous solution containing a specific binder component and an electrochemically activating compound (containing a positive electrode active material) are mixed as a slurry for producing an electrode.

SUMMARY

According to an aspect of the present invention, there is provided a slurry storage device that stores an aqueous slurry containing a high nickel material prepared by a dispersion device which mixes a powder and a solvent, the device including a holding unit that holds the aqueous slurry containing the high nickel material, and a pH value rise suppressing unit that suppresses a rise in a pH value of the aqueous slurry containing the high nickel material.

According to the slurry storage device of the present invention, by providing the pH value rise suppressing unit that suppresses the rise in the pH value of the aqueous slurry containing the high nickel material, it is possible to suppress alkalization (pH value rise) of the aqueous slurry containing the high nickel material held in the holding unit due to a time-dependent change and suppress deterioration of the physical properties of the slurry. As a result, it is possible to stably store the aqueous slurry containing the high nickel material for a long period of time.

According to another aspect of the present invention, there is provided a slurry production system including the above-described slurry storage device; and a dispersion device that prepares an aqueous slurry containing a high nickel material.

According to the slurry production system, the slurry prepared by the dispersion device can be stably stored in a state where alkalization and deterioration of physical properties of the slurry are suppressed until the slurry is transferred to the next process (coating process). As a result, it is possible to facilitate the storage and handling of the aqueous slurry containing the high nickel material, and to reduce the environmental load and the production cost in the entire production of the lithium ion secondary battery.

According to still another aspect of the present invention, there is provided a slurry storage method of storing an aqueous slurry containing a high nickel material prepared by a dispersion device which mixes a powder and a solvent, the method including holding the aqueous slurry containing the high nickel material, and suppressing a rise in a pH value of the aqueous slurry containing the high nickel material.

According to the slurry storage method, by suppressing the rise in the pH value of the aqueous slurry containing the high nickel material, it is possible to suppress alkalization of the aqueous slurry containing the high nickel material held by the holding step due to a time-dependent change and suppress deterioration of the physical properties of the slurry. As a result, it is possible to stably store the aqueous slurry containing the high nickel material for a long period of time.

DETAILED DESCRIPTION

Figure 1:
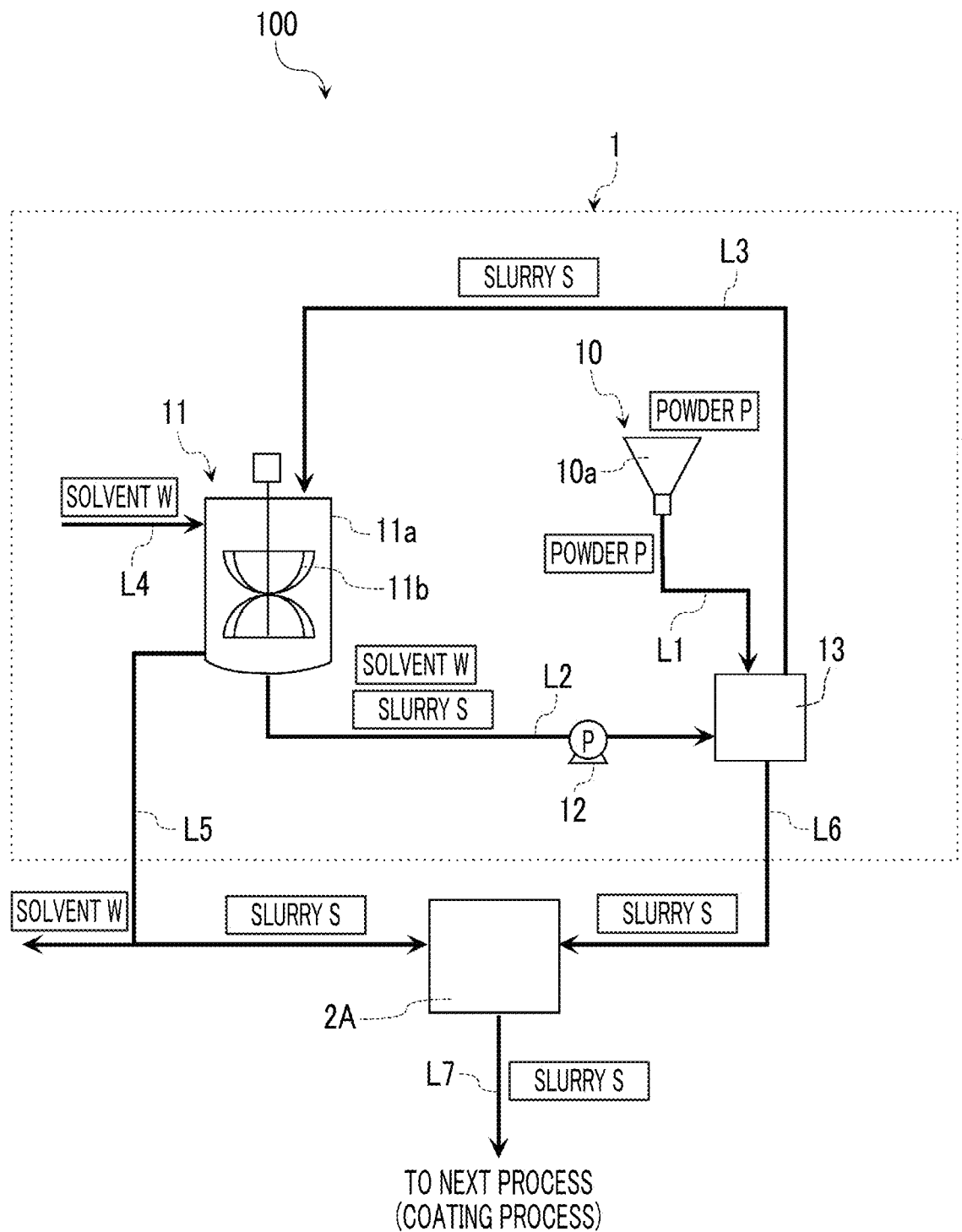
FIG. 1 is a schematic explanatory view illustrating a structure of a slurry production system according to a one embodiment of the present invention.

In the production of electrodes for secondary batteries, it may not be possible to perform a coating process immediately after preparing a slurry due to circumstances such as a production schedule. In this case, the prepared slurry may be temporarily stored and then subjected to the coating process.

On the other hand, among the aqueous slurries (pastes using water as a solvent or a dispersion medium), the present inventors have found that, in particular, when storing an aqueous slurry containing a high nickel material, the pH value of the slurry rises with the passage of time, and the physical properties of the slurry deteriorate. When the pH value of the slurry rises, the current collector coated with the slurry is corroded in the coating process, which is a next process. In addition, the coating itself on the current collector is difficult due to the deterioration of the physical properties of the slurry.

It was considered that the main component (positive electrode active material) of the slurry and water were sufficiently mixed in the aqueous slurry at the time of preparing the slurry, but according to the findings obtained by the present inventors, it was clarified that the prepared aqueous slurry was alkalized with the passage of time. Therefore, it is necessary to store the aqueous slurry as described in the related art under appropriate conditions.

It is desirable to provide a slurry storage device, a slurry production system, and a slurry storage method capable of appropriately storing an aqueous slurry containing a particularly high nickel material among aqueous slurries.

As a result of diligent studies on the above-described circumstances, the present inventors have completed the present invention by finding that aqueous slurry particularly containing a high nickel material among the aqueous slurries can be appropriately stored by providing a pH value rise suppressing unit that suppresses a rise in the pH value of the slurry with respect to a holding unit that holds the slurry. That is, the present invention is a slurry storage device, a slurry production system, and a slurry storage method as follows.

In addition, in one embodiment of the slurry storage device of the present invention, the pH value rise suppressing unit may include a pressurizing unit using supply of a pressurized gas. Based on the findings of the present inventors, it is estimated that the slurry in the holding unit is alkalized by coming into contact with the moisture in the outside air. On the other hand, according to this feature, it is possible to suppress the inflow of outside air into the holding unit. As a result, the slurry in the holding unit does not react with the moisture in the outside air, the rise in the pH value of the slurry can be easily suppressed, and the stable storage of the aqueous slurry containing the high nickel material can be easily performed.

In addition, in one embodiment of the slurry storage device of the present invention, the pressurized gas supplied by the pressurizing unit may be a gas containing carbon dioxide (carbon dioxide gas).

According to this feature, in addition to suppressing the inflow of outside air into the holding unit, a neutralization reaction ($2LiOH+CO_2 \rightarrow Li_2CO_3+H_2O$) occurs between the acid component generated by dissolving carbon dioxide (carbon dioxide gas, $CO_2$) in water and the alkaline component in the slurry on the surface of the slurry contained in the holding unit. As a result, it is possible to more reliably suppress the strong alkalization of the slurry (phenomenon in which the pH value exceeds 10).

In addition, in one embodiment of the slurry storage device of the present invention, the pH value rise suppressing unit may include a dry air supply unit that supplies dry air.

According to this feature, it is possible to reduce the moisture in the gas in the holding unit. As a result, the reaction between the slurry and the moisture in the gas in the holding unit can be suppressed, the rise in the pH value of the slurry can be easily suppressed, and the stable storage of the aqueous slurry containing the high nickel material can be easily performed.

In addition, in one embodiment of the slurry storage device of the present invention, the pH value rise suppressing unit may include a decompression unit.

According to this feature, the gas component in the holding unit can be removed by reducing the pressure in the holding unit. In addition, by removing the gas component, it is possible to reduce the moisture in the gas in the holding unit. As a result, the reaction between the slurry and the moisture in the holding unit can be suppressed, the rise in the pH value of the slurry can be easily suppressed, and the stable storage of the aqueous slurry containing the high nickel material can be easily performed.

By using a vacuum pump or the like as the decompression unit to create a vacuum state inside the holding unit, it is possible to further suppress the rise in the pH value.

In addition, in one embodiment of the slurry storage device of the present invention, a pressure sensor may be provided in the holding unit, and the slurry storage device may further include a pressure regulating unit that regulates a pressure in the holding unit based on a value of the pressure sensor.

According to this feature, by providing a means for detecting the pressure in the holding unit and a means for regulating the pressure according to the value, it is possible to quickly respond to the maintenance and management related to storage of the slurry, and more reliably perform stable storage of the aqueous slurry containing the high nickel material. In addition, it also has the effect of being able to automate the maintenance and management itself related to the storage of the slurry.

Hereinafter, a slurry storage device, a slurry production system, and a slurry storage method according to the present invention will be described in detail with reference to the drawings.

The slurry storage device and the slurry production system described in the embodiment are merely exemplified for describing the slurry storage device and the slurry production system according to the present invention, and the present invention is not limited thereto. The slurry storage method of the present invention is replaced with the following description of a structure and operation of the slurry storage device.

Slurry S to be stored in the present invention is an aqueous slurry containing a lithium transition metal composite oxide used as a positive electrode active material for a lithium ion secondary battery. Examples thereof include an aqueous slurry containing a so-called high nickel material having a particularly high nickel content in a transition metal composite oxide containing lithium.

In the present invention, the high nickel material means a layered oxide-based material containing lithium in which Ni exceeds 0.5 in a case where the transition metal element in the positive electrode active material is 1. Normally, a positive electrode active material having Ni of less than 0.5 is produced by firing in air using lithium carbonate, a transition metal hydroxide or the like as raw materials. Therefore, the positive electrode active material contains substantially no lithium hydroxide having high reactivity. On the other hand, a positive electrode active material with Ni of 0.5 or more is produced by firing in oxygen using highly reactive lithium hydroxide, transition metal hydroxides, transition metal oxyhydroxides or the like as raw materials. Therefore, the positive electrode active material contains a large amount of highly reactive lithium hydroxide. In addition, a positive electrode active material having Ni of 0.5 or more is likely to generate lithium hydroxide by a proton exchange reaction. Therefore, it is considered that such a high nickel material is likely to be alkalized with the passage of time during storage in a case where the high nickel material is prepared as an aqueous slurry using water as a solvent or a dispersion medium.

Examples of the high nickel material include $LiNiO_2$, $Li(Ni_{0.6}Co_{0.4})O_2$, $Li(Ni_{0.8}Co_{0.2})O_2$, $Li(Ni_{0.8}Co_{0.15}Al_{0.05})O_2$, $Li(Ni_{0.6}Co_{0.2}Mn_{0.2})O_2$, $Li(Ni_{0.8}Co_{0.1}Mn_{0.1})O_2$, $Li(Ni_{0.9}Co_{0.05}Mn_{0.05})O_2$, and the like. Other atoms may be replaced for a part of the atomic sites constituting the high nickel material. Examples thereof include a material in which another alkali metal atom replaces a part of the lithium atom site, a material in which a fluorine atom replaces a part of the oxygen atom site of a high nickel material, a material in which an aluminum atom replaces a part of the transition metal atom sites of a high nickel material, and the like.

That is, examples of the high nickel material in the present invention include those represented by $Li_aA_bNi_cM_dAl_eO_fF_g$ (meaning $0<a\le1$, $0\le b<1$, $0.5\le c\le1$, $0\le d\le0.5$, $\le0$ $e\le0.5$, $1<f\le2$, $0\le g<1$, $a+b=1$, $c+d+e=1$, $f+g=2$, A=Na, K, Rb, M=Co, Mn, Fe, Ti, Zr, Nb, Mo, W) in the composition formula.

One Embodiment

Slurry Production System

FIG. 1 is a schematic explanatory view illustrating a structure of a slurry production system according to the one embodiment of the present invention.

As illustrated in FIG. 1, a slurry production system 100 is provided with a dispersion device 1 and a slurry storage device 2A.

In the slurry production system 100 of the present embodiment, the slurry S is first prepared in the dispersion device 1, and then the prepared slurry S is stored in the slurry storage device 2A. Thereafter, the stored slurry S is transferred from the slurry storage device 2A to a place where the next process is performed according to the timing when the next process (mainly the coating process) is performed.

Dispersion Device

The dispersion device 1 may be any device as long as a device can prepare an aqueous slurry containing a high nickel material as the slurry S, and the details of the device configuration are not particularly limited. The dispersion device 1 in the present embodiment refers to a device capable of mixing at least a solid (powder) and a liquid (solvent) to prepare a slurry which is a mixture of a granular solid matter and a liquid, and also includes a device called a mixing device, a kneading device, and the like. As will be described later, it is more preferable that the dispersion device 1 in the present embodiment has a configuration capable of mixing a gas as well. As a result, it is possible to suppress the alkalization of the slurry S at the time of preparation.

Examples of the raw material of the slurry S to be charged into the dispersion device 1 include powder of a positive electrode active material used in a lithium ion secondary battery (hereinafter, simply referred to as a "powder P"), solvent W (water), a binder, a conductive material, and the like. Here, as the positive electrode active material, it is preferable to use a lithium transition metal composite oxide known as a high nickel material. In addition, the binder, the conductive material and the like are appropriately used as needed, and the specific substance is not particularly limited. A known substance can be used in the preparation of the aqueous slurry.

In addition, when preparing the slurry S, a gas such as carbon dioxide (carbon dioxide gas) or an inert gas may be supplied to the dispersion device 1. In particular, it is preferable to supply a gas containing carbon dioxide (carbon dioxide gas) to the dispersion device 1. It is more preferable to supply only carbon dioxide (carbon dioxide gas) to the dispersion device 1. As a result, it is possible to neutralize lithium hydroxide generated during the preparation of the aqueous slurry containing the high nickel material and suppress the strong alkalization of the aqueous slurry containing the high nickel material during the preparation.

In a case where the high nickel material is not contained, lithium hydroxide is not contained in the slurry. Therefore, by supplying carbon dioxide (carbon dioxide gas), the pH value of the aqueous slurry is low (pH value is less than 5), and the transition metal may be dissolved with acid. In the slurry in which the transition metal is dissolved in this manner, the metal may re-precipitate during charging and discharging. In addition, it is not preferable because the discharge capacity of the positive electrode active material is small and stable cycle characteristics cannot be obtained.

The pH value is an index indicating the hydrogen ion concentration. That is, in a case where the pH value is less than 7, it is acidic, and in a case where the pH value exceeds 7, it is alkaline. In the present application, the pH value is a value measured by a pH meter, but as another method, the pH value may be determined by an indicator method or the like.

FIG. 1 illustrates the dispersion device 1 including a powder supply unit 10, a stirring tank 11, a circulation liquid feed pump 12, and a dispersion unit 13. The dispersion device 1 illustrated in FIG. 1 illustrates an example of the dispersion device 1 in the present embodiment, and is not limited to the configuration illustrated in FIG. 1.

The powder supply unit 10 charges a solid component (powder P) of the raw materials of the slurry S into the dispersion unit 13.

As for a structure of the powder supply unit 10, a known structure can be used in the dispersion device for charging the solid component, and the structure is not particularly limited. For example, as illustrated in FIG. 1, as an example of the powder supply unit 10, a hopper 10a having an upper opening portion and a lower opening portion may be provided and installed so that the powder P is charged from the upper opening portion and is supplied from the lower opening portion to the dispersion unit 13 via a line L1.

In addition, various incidental mechanisms maybe provided on the powder supply unit 10 and the line L1. Examples of such an incidental mechanism include a stirring mechanism for stirring the powder P in the powder supply unit 10, a quantitative supply mechanism for quantitatively supplying the powder P from the powder supply unit 10 to the dispersion unit 13, a vibrator or a kicker for removing the powder P adhering to the powder supply unit 10, and the like.

The stirring tank 11 supplies the liquid component (solvent W) of the raw materials of the slurry S to the dispersion unit 13. In addition, the stirring tank 11 is connected to the dispersion unit 13 in a circulatable manner and stores the prepared slurry S.

As a structure of the stirring tank 11, a known structure for supplying the liquid component and storing the slurry in the dispersion device can be used, and is not particularly limited. For example, as illustrated in FIG. 1, as an example of the stirring tank 11, a tank main body 11a and a stirring device 11b inside the tank main body 11a are provided and are connected to the dispersion unit 13 in a circulatable manner via a line L2 and a line L3. In addition, the tank main body 11a may be provided with a line L4 for supplying the solvent W (water) from the outside and a line L5 for exhausting the contents (solvent W or slurry S) in the tank main body 11a to the outside of the system.

The stirring tank 11 can be used also as a holding unit 3 of the slurry storage device 2A. A description of common use of the holding unit 3 of the slurry storage device 2A and the stirring tank 11 will be described later.

The circulation liquid feed pump 12 is for controlling the flow directions of the solvent W and the slurry S in the dispersion device 1 and regulating the flow rate.

For example, as illustrated in FIG. 1, as the circulation liquid feed pump 12, a pump capable of sucking the solvent W and the slurry S in the stirring tank 11 and delivering the solvent W and the slurry S toward the dispersion unit 13 may be provided on the line L2. As a result, the solvent W and the slurry S circulate between the stirring tank 11 and the dispersion unit 13, and the dispersion treatment in the dispersion unit 13 can be repeated, so that it is possible to homogenize the dispersion of the powder P with respect to the solvent W.

The dispersion unit 13 is for preparing a slurry S by mixing and dispersing a solid component (powder P) and a liquid component (solvent W).

For example, as the dispersion unit 13, one having a configuration that disperses by ultrasonic waves, one having a configuration that disperses by shearing force, such as a planetary mixer and a twin-screw kneader, one having a configuration that disperses by cavitation and shearing force, and the like may be used. From the viewpoint that a kneading process is not required and excessive pulverization of the positive electrode active material is unlikely to occur, it is more preferable to use one having a configuration in which dispersion is performed by cavitation and shearing force. Examples of those that disperse by cavitation and shearing force include "JET PASTER (registered trademark)" manufactured by Nihon Spindle Manufacturing Co., Ltd. as a commercially available product.

The powder P and the solvent W are supplied to the dispersion unit 13 from the powder supply unit 10 and the stirring tank 11 via the lines L1 and L2.

Means for supplying a binder, a conductive material, or the like to the dispersion unit 13 is not particularly limited. For example, it may be supplied together with the powder P from the powder supply unit 10 via the line L1, or supplied to the stirring tank 11 and mixed with the solvent W and then supplied via the line L2.

The slurry S prepared in the dispersion unit 13 may be circulated to the stirring tank 11 via the line L3, or may be supplied to the slurry storage device 2A via the line L6. In addition, the slurry S in the stirring tank 11 may also be circulated to the dispersion unit 13 via the line L2, or may be supplied to the slurry storage device 2A by branching a part of the line L2 or the line L5.

After the preparation of the slurry S, the determination regarding a supply destination of the slurry S, such as circulation in the dispersion device 1 or supply to the slurry storage device 2A, can be appropriately performed according to the preparation amount and preparation conditions of the slurry S. For example, the supply destination of the slurry S may be determined based on the driving time of the dispersion unit 13, the input amount of the powder P, and the like. In addition, the determination regarding the supply destination of the slurry S and the switching of the supply destination based on the determination may be performed manually by a worker, and maybe executed by a control unit including a CPU or a circuit for executing the program.

Slurry Storage Device

Figure 2A:
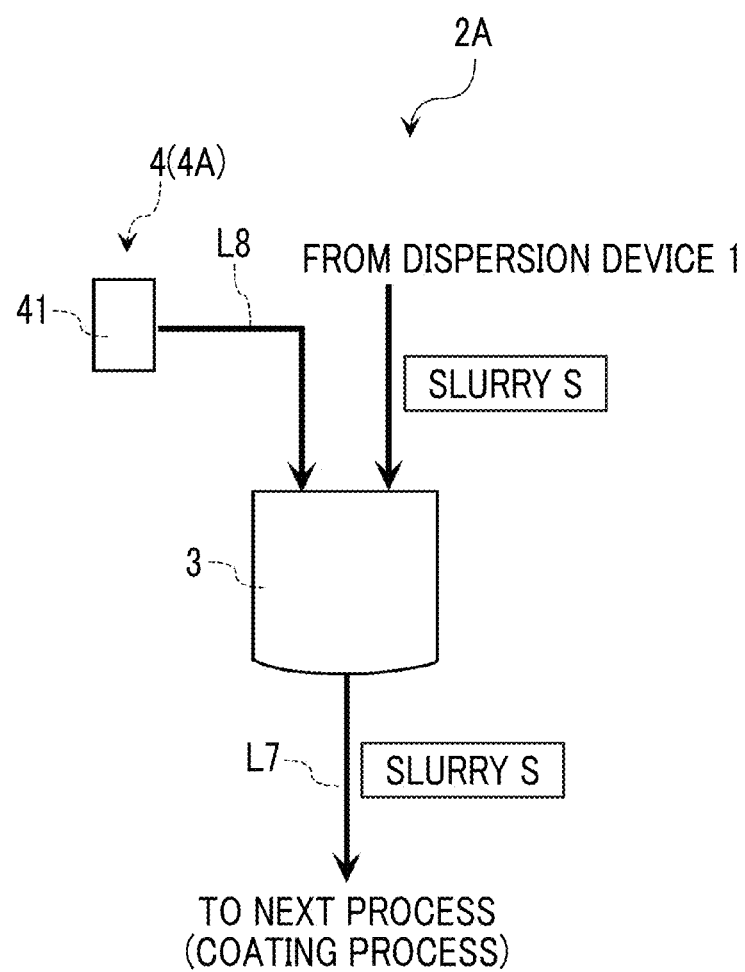
FIG. 2A is a schematic explanatory view illustrating a structure of a slurry storage device according to the one embodiment of the present invention.
Figure 2B:
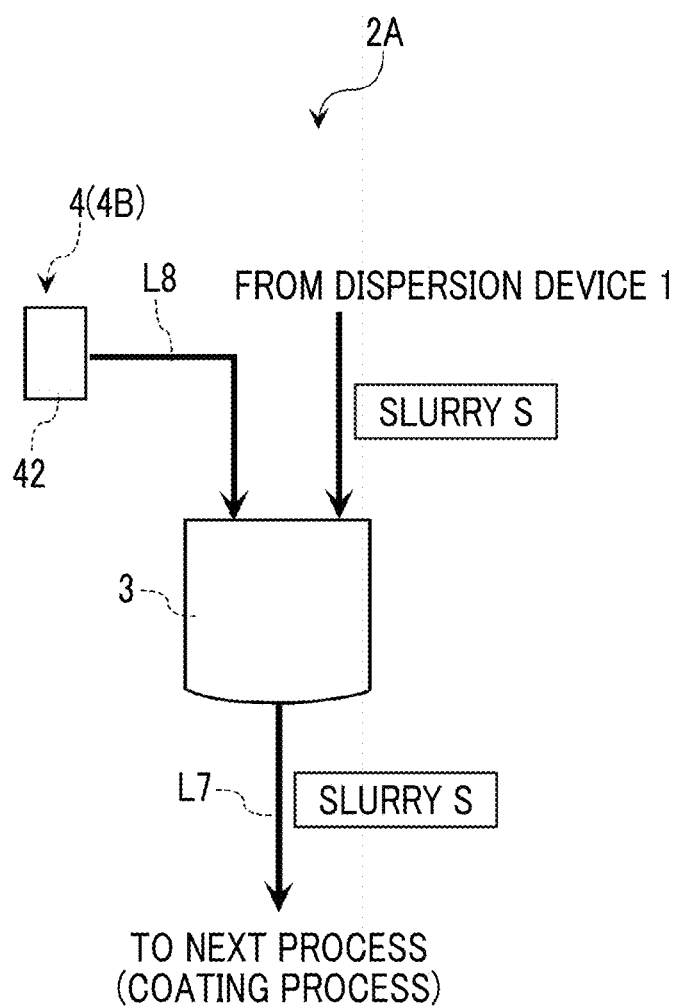
FIG. 2B is a schematic explanatory view illustrating another aspect of the slurry storage device according to the one embodiment of the present invention.
Figure 2C:
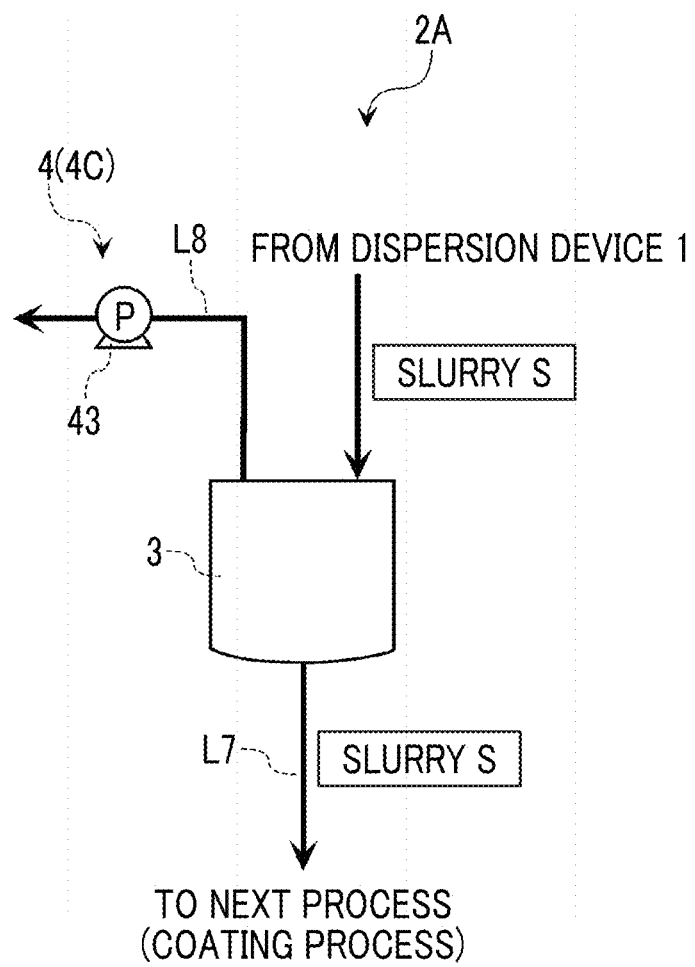
FIG. 2C is a schematic explanatory view illustrating another aspect of the slurry storage device according to the one embodiment of the present invention.

FIGS. 2A to 2C are schematic explanatory views illustrating the structure of the slurry storage device according to the one embodiment of the present invention.

As illustrated in FIGS. 2A to 2C, the slurry storage device 2A is provided with a holding unit 3 for holding the slurry S and a pH value rise suppressing unit 4 for suppressing a rise in the pH value of the slurry S.

The slurry storage device 2A of the present embodiment is for containing and storing the slurry S prepared by the dispersion device 1. When the storage period is over, the slurry S is transferred to the next process (coating process) via the line L7 provided in the holding unit 3.

The holding unit 3 has a space for holding the slurry S, and preferably has a sealable structure having chemical resistance and pressure resistance.

The specific structure of the holding unit 3 is not particularly limited. Examples of the holding unit 3 include a bottomed tubular structure or a tubular structure having a lid portion that can be sealed and having chemical resistance and pressure resistance.

In addition, the holding unit 3 may be provided with various incidental mechanisms. For example, a stirring mechanism may be provided in the holding unit 3 so that the slurry S can be stirred. As a result, the contact efficiency between the gas (particularly carbon dioxide (carbon dioxide gas)) supplied by the pH value rise suppressing unit 4 described later and the slurry S can be increased, and the pH value rise suppressing effect due to the neutralization reaction or the like can be enhanced. In addition, as another example, a temperature control mechanism may be provided in the holding unit 3 to control the temperature suitable for storing the slurry S. As such a temperature control mechanism, for example, a heating mechanism may be provided. As a result, it is possible to discharge the gas (carbon dioxide (carbon dioxide gas)) dissolved in the slurry S and impart a function of suppressing alkalization on the surface of the slurry S. In addition, as another example, a cooling mechanism may be provided. As a result, it is possible to impart a function of maintaining the gas (carbon dioxide (carbon dioxide gas)) supplied in the holding unit 3 at a lower pressure. Furthermore, as the temperature control mechanism, a mechanism capable of switching between heating and cooling may be provided, and the above-described functions maybe appropriately selected to perform executable control. As a result, in combination with the pH value rise suppressing unit 4 described later, it is possible to further suppress the rise in the pH value of the slurry S during storage and keep stable storage.

The pH value rise suppressing unit 4 is for suppressing the rise in the pH value of the slurry S and suppressing the alkalization of the slurry S.

The pH value rise suppressing unit 4 is not particularly limited as long as it can suppress the alkalization of the slurry S. However, when a pH value regulating agent is added as the pH value rise suppressing unit 4, the physical properties and composition of the slurry S may be affected. Therefore, as the pH value rise suppressing unit 4, it is preferable to use a means other than adding the pH value regulating agent.

Normally, it is known that when the pH value of the slurry S exceeds 11, there is a problem that a current collector (mainly an aluminum current collector) is corroded at the time of coating. Therefore, the pH value of the slurry S is preferably 11 or less, more preferably 10 or less, by the pH value rise suppressing unit 4.

As illustrated in FIG. 2A, examples of the pH value rise suppressing unit 4 of the present embodiment include those provided with a pressurizing unit 4A using supply of the pressurized gas.

The pressurizing unit 4A may be any device as long as it can supply a pressurized gas and increase the pressure in the holding unit 3 via the line L8, and the specific configuration is not particularly limited. For example, as illustrated in FIG. 2A, gas may be supplied directly into the holding unit 3 from a high-pressure gas container (cylinder) 41 or the like, or a pressure pump may be provided to supply gas into the holding unit 3.

As a result of the study by the present inventors, it is estimated that the slurry Sin the holding unit 3 is alkalized by coming into contact with the moisture in the outside air. Therefore, by supplying the pressurized gas by the pressurizing unit 4A and making the inside of the holding unit 3 positive pressure, it is possible to suppress the inflow of outside air into the holding unit 3. As a result, the slurry S in the holding unit 3 does not react with the moisture in the outside air, and the rise in the pH value of the slurry S can be suppressed.

The value of the pressure in the holding unit 3 boosted by the pressurizing unit 4A is not particularly limited, and can be appropriately set according to the expression conditions of the desired effect, the aspect of use, and the like. For example, from the viewpoint of surely obtaining the effect of suppressing the alkalization of the slurry S by pressurization, the lower limit of the pressure value is preferably 0.05 MPa (gauge pressure, the same applies hereinafter) or more, and more preferably 0.1 MPa or more. In addition, for example, from the viewpoint of the pressure resistance of the holding unit 3, the upper limit of the pressure value is preferably 0.6 MPa or less, and more preferably 0.5 MPa or less.

Examples of the pressurized gas supplied by the pressurizing unit 4A include an inert gas such as nitrogen gas and argon gas, and a gas showing acidity when dissolved in water such as carbon dioxide (carbon dioxide gas).

In the pressurizing unit 4A of the present embodiment, it is preferable to use carbon dioxide (carbon dioxide gas) as the pressurized gas. In this case, since the solvent W of the slurry S is water, carbon dioxide (carbonic dioxide gas) dissolves in water on the surface of the slurry S contained in the holding unit 3 to generate an acid component (carbonic acid). Therefore, on the surface of the slurry S contained in the holding unit 3, a neutralization reaction between the alkaline component such as lithium hydroxide and the acid component (carbonic acid) in the slurry S occurs. As a result, it is possible to more reliably suppress the alkalization of the slurry S. In addition, from the viewpoint of not affecting the physical properties and composition of the slurry S, it is preferable to use carbon dioxide (carbon dioxide gas) as the pressurized gas.

When supplying carbon dioxide (carbon dioxide gas) as a pressurized gas, it is preferable to supply carbon dioxide directly from a high-pressure gas container. The high-pressure gas container for carbon dioxide (carbon dioxide gas) is easily available and does not require a driving device such as a pump to supply the pressurized gas. As a result, it is possible to reduce the cost of storing the slurry S.

As illustrated in FIG. 2B, examples of another aspect of the pH value rise suppressing unit 4 of the present embodiment include those provided with a dry air supply unit 4B for supplying dry air.

The dry air supply unit 4B is not particularly limited as long as it can supply air (dry air) having a low moisture content (humidity) into the holding unit 3. As the dry air supply unit 4B, a dry air generator 42 capable of generating air from which the moisture is removed may be used. The specific configuration of the dry air generator 42 is not particularly limited, and a known generator may be used. As the dry air in the present embodiment, it is preferable to use air having an absolute humidity of 1% or less from the viewpoint of surely obtaining the effect of suppressing the alkalization of the slurry S.

By providing the dry air supply unit 4B as the pH value rise suppressing unit 4, the moisture in the gas in the holding unit 3 can be reduced. As a result, the reaction between the slurry S and the moisture in the gas in the holding unit 3 can be suppressed, and the rise in the pH value of the slurry S can be suppressed.

In the dry air supply unit 4B, the dry air does not need to be supplied in a pressurized state, but the pressurized dry air may be supplied. As a result, the effect related to the pressurizing unit 4A can also be obtained.

As illustrated in FIG. 2C, examples of another aspect of the pH value rise suppressing unit 4 of the present embodiment include those provided with a decompression unit 4C.

The decompression unit 4C is not particularly limited as long as it can reduce the pressure in the holding unit 3. Examples of the decompression unit 4C include providing a decompression pump 43 for the holding unit 3.

The value of the pressure in the holding unit 3 decompressed by the decompression unit 4C is not particularly limited, and can be appropriately set according to the expression conditions of the desired effect, the aspect of use, and the like. For example, from the viewpoint of surely obtaining the effect of suppressing the alkalization of the slurry S, the pressure value is preferably −0.07 MPa or less.

By providing the decompression unit 4C as the pH value rise suppressing unit 4, the pressure in the holding unit 3 is a negative pressure, so that it is possible to reduce the moisture in the gas in the holding unit 3. As a result, the reaction between the slurry S and the moisture in the gas in the holding unit 3 can be suppressed, and the rise in the pH value of the slurry S can be suppressed.

In addition, the holding unit 3 in the slurry storage device 2A of the present embodiment is not limited to the one provided independently of the dispersion device 1 as illustrated in FIGS. 1 and 2A to 2C. For example, the configuration (stirring tank 11) in the dispersion device 1 may also have the function of the holding unit 3.

Figure 3:
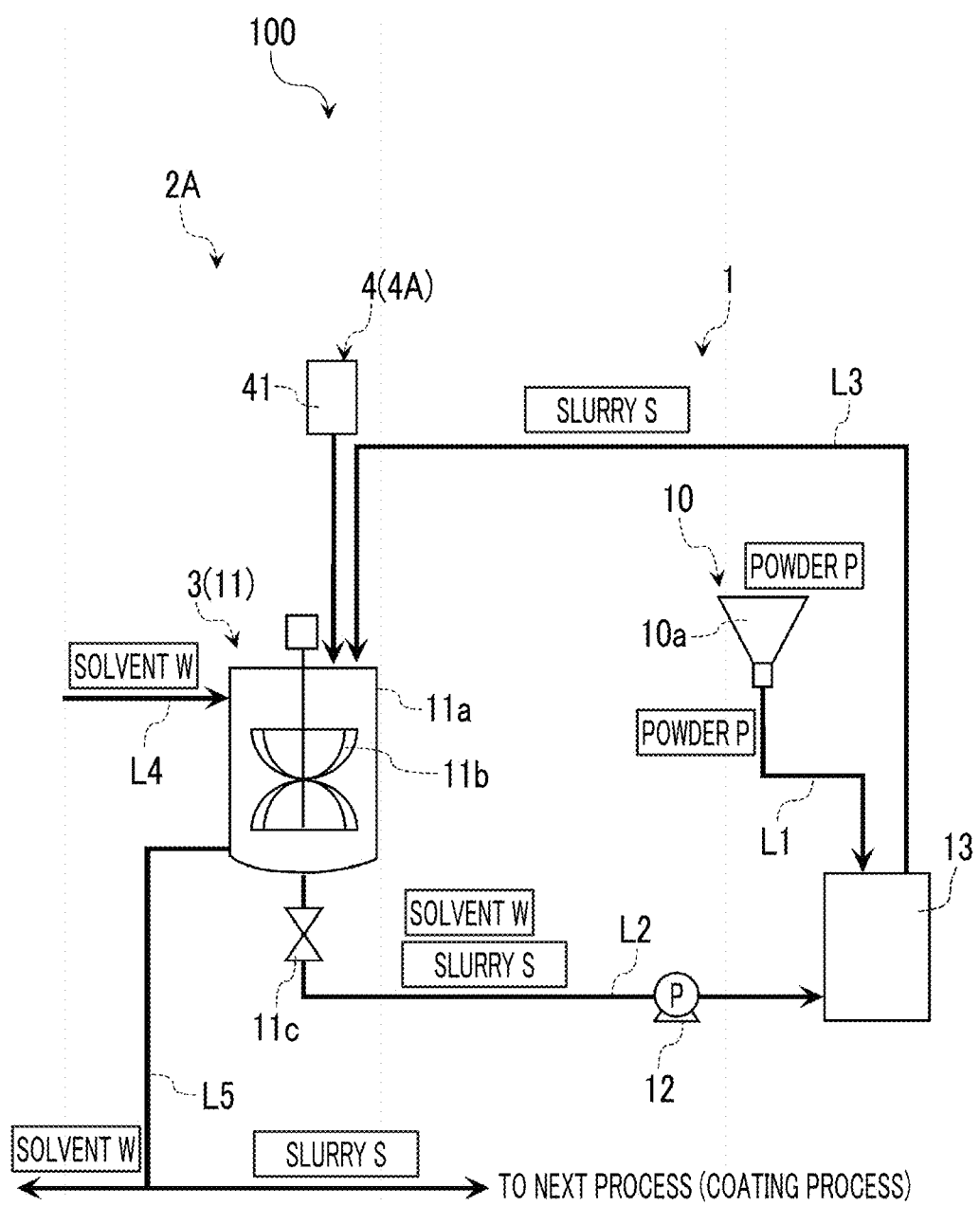
FIG. 3 is a schematic explanatory view illustrating another aspect of the slurry production system and the slurry storage device according to the one embodiment of the present invention.

FIG. 3 is a schematic explanatory view illustrating the stirring tank 11 in the dispersion device 1 also having the function of the holding unit 3, as another aspect of the slurry production system 100 and the slurry storage device 2A.

FIG. 3 illustrates the stirring tank 11 provided with the pressurizing unit 4A as the pH value rise suppressing unit 4, but any of the above-described pH value rise suppressing unit 4 may be applied, and is not particularly limited.

As illustrated in FIG. 3, an on/off switching valve 11c is provided on the line L2 connected to the stirring tank 11 of the dispersion device 1, and when the slurry S is prepared, the on/off switching valve 11c is opened to form a circulation path between the stirring tank 11 and the dispersion unit 13. On the other hand, when the slurry S is stored, the on/off switching valve 11c is closed so that the slurry S can be contained in the stirring tank 11 and the function of the holding unit 3 can be provided. Therefore, while the on/off switching valve 11c is closed, carbon dioxide (carbon dioxide gas) is supplied into the stirring tank 11 as a pressurized gas by the pH value rise suppressing unit 4 (pressurizing unit 4A). Therefore, it is possible to suppress alkalization of the slurry S in the stirring tank 11, and keep stable storage. A part of the line L2 or the line L5 connected to the stirring tank 11 may be branched, and when the storage period ends, the slurry S may be transferred to the next process (coating process) via the branched line L2 or the line L5.

As illustrated in FIG. 3, by using the stirring tank 11 of the dispersion device 1 also as the holding unit 3 of the slurry storage device 2A of the present embodiment, the configuration of the entire slurry production system 100 can be made compact.

Hereinafter, a specific example of the slurry storage device of the present embodiment will be described.

The implementation conditions of the example are as follows. As the holding unit 3, a sealable withstanding pressure container having a volume of 300 mL was used. In addition, as the slurry S, 100 mL of an aqueous high nickel slurry containing a positive electrode active material of the composition formula $LiNi_{0.8}Co_{0.15}Al_{0.05}$ was contained in the holding unit 3. Furthermore, as the pH value rise suppressing unit 4, the pressurizing unit 4A was used to supply carbon dioxide (carbon dioxide gas) to the holding unit 3 (withstanding pressure container), and the pressure in the holding unit 3 (withstanding pressure container) was set to 0.1 MPa in gauge pressure.

On the other hand, the implementation conditions of the comparative example were those using the same holding unit 3 and the slurry S as those in the example. In addition, the comparative example is not provided with the pH value rise suppressing unit 4.

Figure 4:
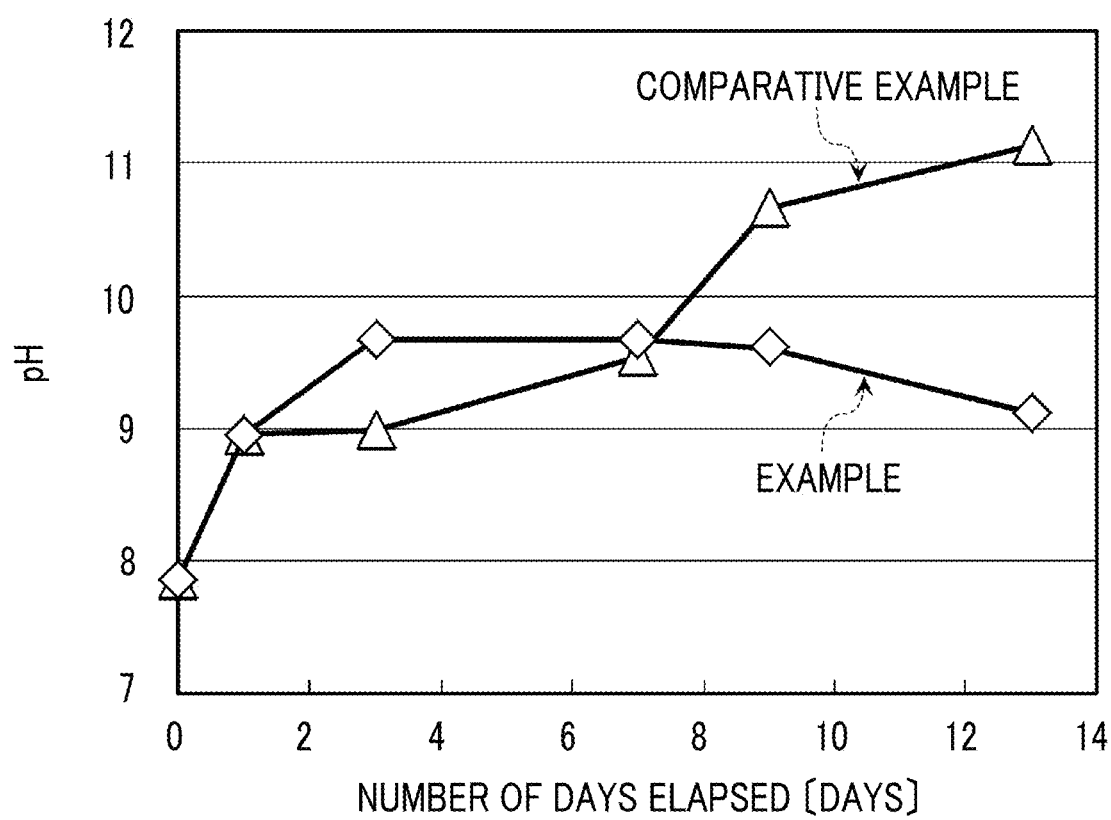
FIG. 4 is a graph illustrating a time-dependent change in pH values when an aqueous slurry containing a high nickel material is stored using the slurry storage device according to the one embodiment of the present invention.

FIG. 4 is a graph illustrating a time-dependent change in pH values when an aqueous slurry containing a high nickel material is stored using the slurry storage device 2A of the present embodiment. The vertical axis of FIG. 4 illustrates the pH value of the slurry S, and the horizontal axis of FIG. 4 illustrates the number of days elapsed since the slurry S was contained in the holding unit 3. In addition, here, a white square (◇) illustrates the example, and a white triangle (Δ) illustrates the comparative example.

From FIG. 4, in the example, the pH value increases by approximately 1,5 with the passage of time, but it is found that the pH value does not exceed 10 thereafter, and the pH value remains in the range of 9 to 10. On the other hand, in the comparative example, it is found that the pH value continues to rise with the passage of time.

Therefore, it was shown that the slurry storage device 2A in the present embodiment can suppress the rise in the pH value during storage of the aqueous slurry containing the high nickel material, and keep stable storage.

As described above, according to the slurry storage device and the slurry storage method of the present embodiment, it is possible to suppress alkalization due to a time-dependent change and suppress deterioration of the physical properties of the slurry, particularly for the aqueous slurry containing the high nickel material among the aqueous slurries. As a result, it is possible to appropriately store the aqueous slurry containing the high nickel material.

In addition, by using the slurry production system of the present embodiment, the prepared slurry can be appropriately stored, so that the slurry can be transferred to the next process (coating process) while maintaining the quality of the slurry. In particular, by facilitating the storage and handling of the aqueous slurry containing the high nickel material, it is possible to reduce the environmental load and the production cost in the entire production of the lithium ion secondary battery.

Another Embodiment

Figure 5:
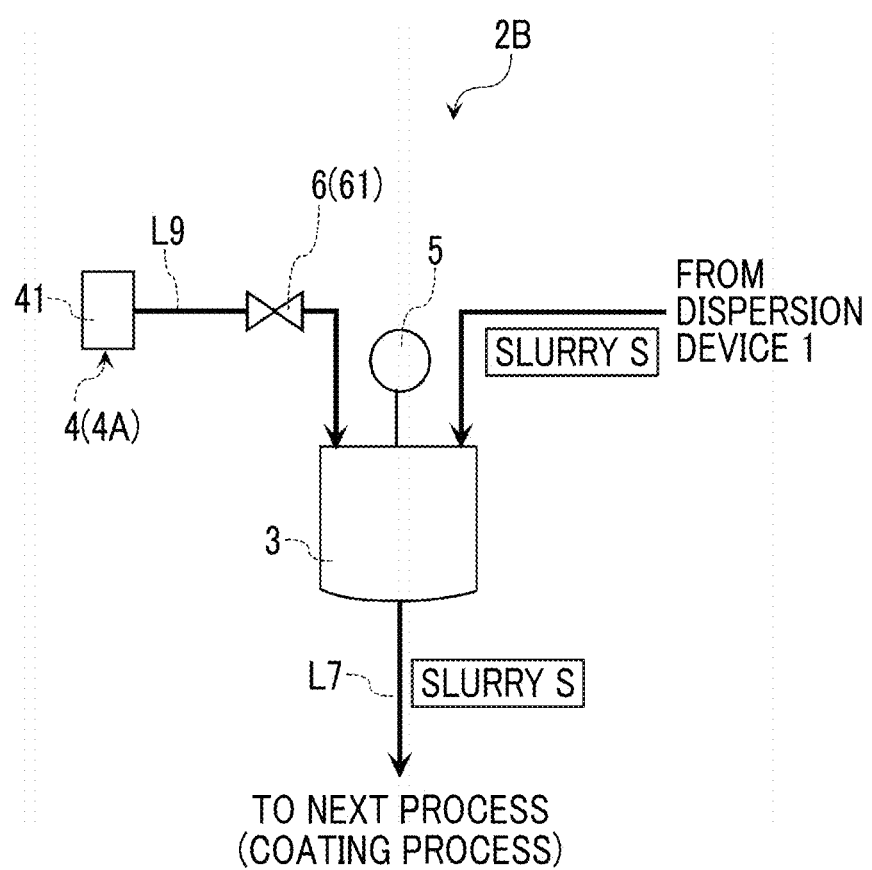
FIG. 5 is a schematic explanatory view illustrating a structure of a slurry storage device according to another embodiment of the present invention.

FIG. 5 is a schematic explanatory view illustrating a configuration of a slurry storage device according to another embodiment of the present invention.

As illustrated in FIG. 5, a slurry storage device 2B of the other embodiment is provided with a pressure sensor 5 and a pressure regulating unit 6 for regulating the pressure in the holding unit 3 based on the value of the pressure sensor 5 in the holding unit 3 in the slurry storage device 2A of the one embodiment. FIG. 5 illustrates the device provided with the pressure sensor 5 and the pressure regulating unit 6 with respect to the slurry storage device 2A described with reference to FIG. 2A in the one embodiment. In addition, the description of the same configuration as that of the one embodiment will be omitted.

The slurry storage device 2B of the present embodiment detects the pressure in the holding unit 3 by the pressure sensor 5, and regulates the pressure in the holding unit 3 by the pressure regulating unit 6 based on a detected value. As a result, in a case where the holding unit 3 is pressurized or depressurized by the pH value rise suppressing unit 4, the pressure sensor 5 can detect a state deviating from the pressure value suitable for suppressing the alkalization of the slurry S. In addition, the pressure can be regulated by the pressure regulating unit 6 so that the pressure inside the holding unit 3 is an appropriate pressure value. Therefore, it is possible to quickly determine and respond to the maintenance and management related to the storage of the slurry S. In addition, by connecting the pressure sensor 5 and the pressure regulating unit 6 so that data can be input and controlled, it is possible to automate the maintenance and management related to the storage of the slurry S.

The pressure sensor 5 is not particularly limited as long as a sensor can detect the pressure in the holding unit 3. A detection result of the pressure sensor 5 may be directly input to the pressure regulating unit 6 as detection data, or the detection result recorded by the worker may be manually input to the pressure regulating unit 6. In order to automate the maintenance and management related to the storage of the slurry S, it is preferable that the detection result of the pressure sensor 5 can be directly input to the pressure regulating unit 6 as data.

The pressure regulating unit 6 is not particularly limited as long as it can regulate the pressure in the holding unit 3 based on the detection result of the pressure sensor 5. Examples of the pressure regulating unit 6 include regulating the supply amount of the pressurized gas to the pressurizing unit 4A provided as the pH value rise suppressing unit 4, regulating the driving force of the decompression pump to the decompression unit 4C, and the like.

More specifically, as illustrated in FIG. 5, on the line L9 connecting the high-pressure gas container 41 and the holding unit 3, as the pressure regulating unit 6, a valve 61, which is a mechanism capable of controlling the amount of gas supplied from the high-pressure gas container 41, may be provided.

In addition, the valve 61 and the pressure sensor 5 may be connected to each other in a controllable manner, and a control unit (not illustrated) may be provided in which the detection result of the pressure sensor 5 is input, it is determined whether or not the detection result is within an appropriate range, and the opening degree of the valve 61 is determined and operated according to the detection result. As a result, it is possible to automate the maintenance and management related to storage of the slurry.

Furthermore, as another example of the pressure regulating unit 6, a mechanism for regulating the pressure in the holding unit 3 is independently provided separately from the pH value rise suppressing unit 4. As a result, even in a case where a problem occurs on the pH value rise suppressing unit 4 side, the pressure in the holding unit 3 can be appropriately maintained, and the slurry S can be stably stored.

As described above, the slurry storage device 2B of the present embodiment is provided with a pressure sensor for detecting the pressure in the holding unit and a pressure regulating unit for regulating the pressure in the holding unit according to the value of the pressure. Therefore, it is possible to quickly respond to the maintenance and management related to storage of the slurry, and more reliably perform stable storage of the aqueous slurry containing the high nickel material. In addition, it also has the effect of being able to automate the maintenance and management itself related to the storage of the slurry.

In addition, the slurry storage device 2B of the present embodiment can also be suitably used as a slurry storage device in the slurry production system 100 illustrated in the one embodiment. As a result, it is possible to quickly respond to the maintenance and management related to the storage of the slurry, and to make the slurry production system capable of more reliably performing stable storage of the aqueous slurry containing the high nickel material. In addition, it also has the effect of enabling a slurry production system to be automate the maintenance and management itself related to the storage of the slurry.

The above-described embodiment illustrates an example of the slurry storage device, the slurry production system, and the slurry storage method. The slurry storage device, the slurry production system, and the slurry storage method according to the present invention are not limited to the above-described embodiment. The slurry storage device, the slurry production system, and the slurry storage method according to the above-described embodiment may be modified without changing the concept described in the aspects.

For example, as the slurry storage device of the present embodiment, an adsorbent that adsorbs moisture may be provided in the holding unit. As a result, it is possible to further reduce the moisture in the gas in the holding unit. Therefore, it is possible to further suppress the alkalization of the slurry during storage of the slurry.

In addition, for example, in a case where a high-pressure gas container of carbon dioxide (carbon dioxide gas) is used as a pressurizing unit among the pH value rise suppressing unit as the slurry storage device and the slurry production system of the present embodiment, the high-pressure gas container may also be connected to the dispersion unit and used as a means for supplying carbon dioxide (carbon dioxide gas) during the dispersion treatment. In addition, a high-pressure gas container may be connected so that the holding unit and the dispersion unit can be switched. In this case, it is possible to supply carbon dioxide (carbon dioxide gas) from the high-pressure gas container to the dispersion unit side at the time of preparing the slurry, and to supply carbon dioxide (carbon dioxide gas) from the high-pressure gas container to the holding unit side at the time of storing the slurry. As a result, it is possible to make the entire slurry production system compact.

The slurry storage device and the slurry storage method of the present invention can be used as a storage technique capable of appropriately storing the slurry. In particular, these device and method can be suitably used as a storage technique for appropriately storing an aqueous slurry containing a high nickel material.

The slurry production system of the present invention can be used as a slurry production system that can be stored in a state where the quality of the slurry is maintained after the slurry is prepared. In particular, the system can be suitably used as a slurry production system for preparing an aqueous slurry containing a high nickel material.

It should be understood that the invention is not limited to the above-described embodiment, but may be modified into various forms on the basis of the spirit of the invention. Additionally, the modifications are included in the scope of the invention.

What is claimed is:

1. A slurry production system comprising:
 a dispersion device including
  a dispersion unit configured to mix a powder and a solvent,
  a powder supply unit configured to supply the powder to the dispersion unit, and
  a stirring tank configured to store an aqueous slurry while supplying a liquid to the dispersion unit; and
 a slurry storage device that stores the aqueous slurry containing a high nickel material prepared by the dispersion device, wherein
 the slurry storage device includes
  a holding unit configured to hold the aqueous slurry, and
  a pH value rise suppressing unit configured to suppress a rise in a pH value of the aqueous slurry held by the holding unit.

2. The slurry production system according to claim 1, wherein
 the pH value rise suppressing unit includes a pressurizing unit using supply of a pressurized gas.

3. The slurry production system according to claim 2, wherein
 the pressurized gas supplied by the pressurizing unit is a gas containing carbon dioxide (carbon dioxide gas).

4. The slurry production system according to claim 3, wherein
 the pressurized gas is directly supplied from a high-pressure gas container to the holding unit.

5. The slurry production system according to claim 1, wherein
 the pH value rise suppressing unit includes a dry air supply unit that supplies dry air.

6. The slurry production system according to claim 5, wherein
 the dry air supply unit is a dry air generator that generates air from which moisture is removed.

7. The slurry production system according to claim 6, wherein the dry air supplied by the dry air supply unit has an absolute humidity of a predetermined value or less.

8. The slurry production system according to claim 7, wherein
the predetermined value is 1%.

9. The slurry production system according to claim 1, wherein
the pH value rise suppressing unit includes a decompression unit.

10. The slurry production system according to claim 1, wherein
the holding unit has chemical resistance and pressure resistance.

11. The slurry production system according to claim 10, wherein
a stirring mechanism for stirring a slurry is provided in the holding unit.

12. The slurry production system according to claim 10, wherein
a temperature control mechanism that controls a temperature for storing a slurry is provided in the holding unit.

13. The slurry production system according to claim 12, wherein
the temperature control mechanism is a mechanism capable of switching between heating and cooling.

14. The slurry production system according to claim 1, wherein
a pressure sensor is provided in the holding unit, and
the slurry storage device further includes
a pressure regulating unit that regulates a pressure in the holding unit based on a value of the pressure sensor.

* * * * *